UNITED STATES PATENT OFFICE.

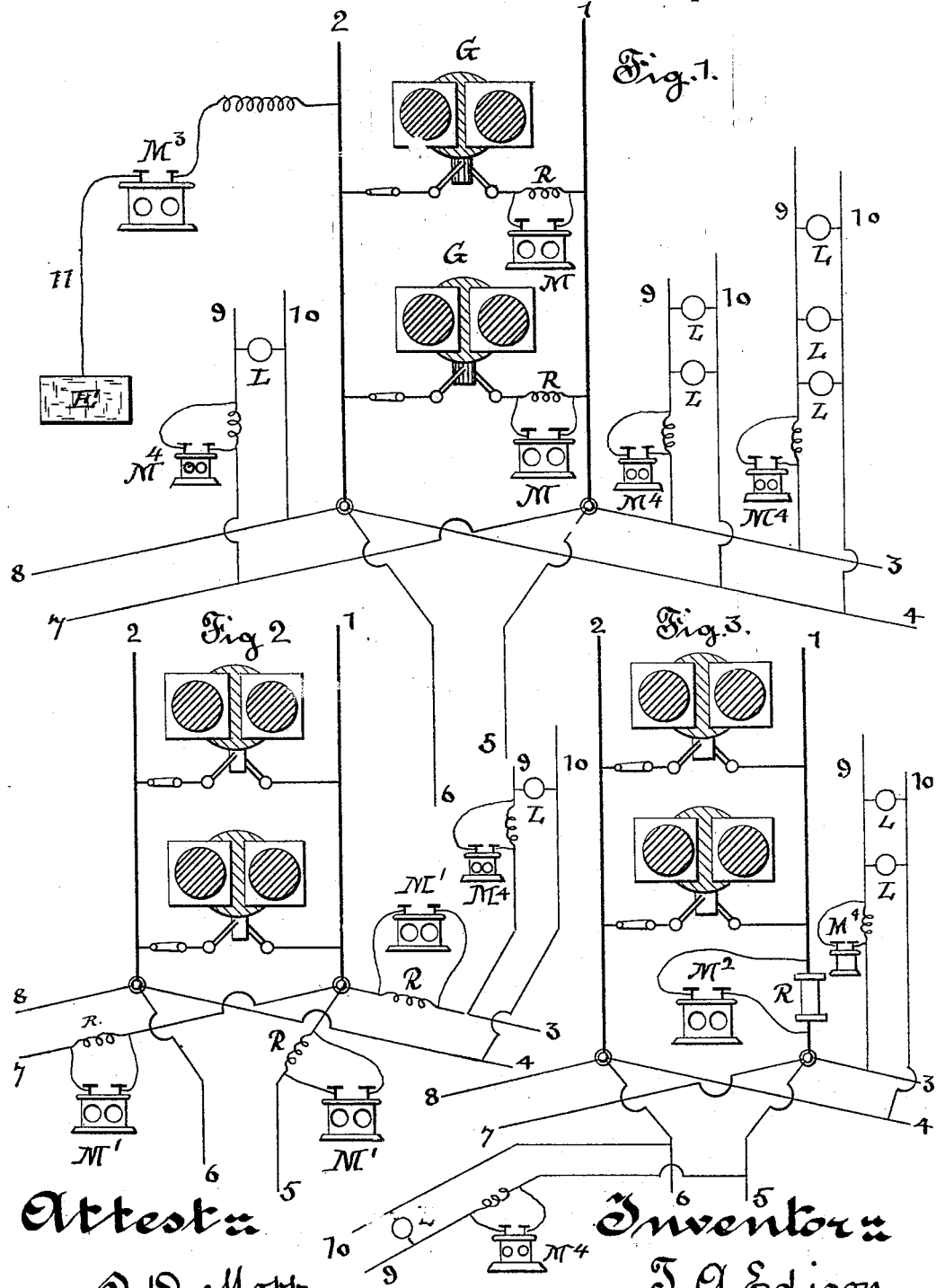

THOMAS A. EDISON, OF MENLO PARK, NEW JERSEY, ASSIGNOR TO THE EDISON ELECTRIC LIGHT COMPANY, OF NEW YORK, N. Y.

MEASUREMENT OF ELECTRICITY IN DISTRIBUTION SYSTEMS.

SPECIFICATION forming part of Letters Patent No. 425,760, dated April 15, 1890.

Application filed June 22, 1881. Serial No. 36,292. (No model.) Patented in England October 19, 1881, No. 4,571, and in France December 17, 1881, No. 145,724.

*To all whom it may concern:*

Be it known that I, THOMAS A. EDISON, of Menlo Park, in the county of Middlesex and State of New Jersey, have invented a new and useful Improvement in the Measurement of Electricity in Distribution Systems, (said invention being patented in Great Britain by Letters Patent No. 4,571, dated October 19, 1881, and in France by Patent No. 145,724, dated December 17, 1881;) and I do hereby declare that the following is a full and exact description of the same, reference being had to the accompanying drawings, and to the letters of reference marked thereon.

The object I have in view is to produce method and means for determining the aggregate consumption of electricity in a distribution system from the central station where no individual meters are employed, or for ascertaining at the central station the correctness of the total consumption shown by all the house-meters, so as to furnish data for comparison with the meter accounts, for the purpose principally of ascertaining the condition of the system and to determine the amount of leakage, in order that the cause of any unusual waste of energy by leakage can be investigated and removed. This I accomplish by arranging at the central station of the system or point of generation a meter or meters for the measurement of electric currents, which will give the total current generated by the dynamo or magneto electric machines and thrown into the main or consumption circuit, and also a meter for recording the total leakage that goes to earth throughout the system, the difference between the former and latter representing the total amount of electricity used by the consumers, except that which leaks across between the conductors without going to earth. These meters can be of any efficient construction, the electroplating or depositing-cell meters shown in my patents and prior applications being preferred.

The meter or meters for measuring the current generated by the dynamo or magneto electric machines can be arranged in any one of three ways: A single or double meter could be located in a shunt from the derived or multiple-arc circuit of each machine, between the positive pole of the machine and the positive main feeding-conductor; or a single or double meter could be placed in a shunt from the positive main feeding-conductor between the machine or machines and the branch conductors; or a meter (either single or double) could be arranged in a shunt from the positive conductor of each branch or consumption circuit. In any case this meter or these meters would be at the central station or point of generation and would indicate the total current thrown into the consumption-circuit by the generators, only a portion of the current, however, being shunted through the meters, as will be readily understood.

The meter for measuring leakage is in a line from ground to the return or negative main feeding-conductor, the leakage of the system that goes to earth producing the flow of an equal current from the ground to the generators.

In the drawings the three figures are diagrammatic views of the different ways in which the station-meters can be arranged.

1 2 are the main feeding-conductors, and 3 4 5 6 7 8 the branch or consumption circuits. From the latter extend the house-conductors 9 10, connected in multiple arc with the branch or consumption circuits, and in derived circuits from 9 10 are arranged the lamps L or other translating devices.

G represents the electrical generators, which are dynamo or magneto electric machines connected in multiple arc with 1 2.

M M, Fig. 1, are the current-meters arranged in shunts between G and 1. These meters can be replaced by meters M', Fig. 2, in shunts of the positive conductors 3, 5, and 7 of the branch or consumption circuits, or by a meter $M^2$, Fig. 3, in shunt from 1 between G and the branch or consumption circuits. A resistance R is employed to shunt a definite proportion of the current through the meters. $M^3$ is the leakage-meter in line 11 from earth E to 2. All these meters M, M', $M^2$, and $M^3$ are station-meters, and the total consumption of the system is determined from them by the difference between M M' or $M^2$ and $M^3$. If the system were used for supplying a single customer, these meters only would be required; but in a general distribution system each house-circuit has a separate meter M⁴, so as to measure the electricity at the point of consumption.

In this case the operation is as follows under ordinary conditions: The meters in circuit at the points of generation furnish the data for a determination of the full current generated. Those at points of consumption furnish data for current consumed by translating devices. The difference between these two determinations will be the current that leaks from one side of circuit to the other through the insulation without going to earth, due to defective insulation, and also the current that leaks from one side to the other through earth, due to ground-connections of the opposite side of the system. If either the insulation-leaks or ground-leaks are determined, the other can be readily fixed; hence the use of the leakage-meter for ground-leaks. This is connected between one side of system and earth. It forms a ground-connection of much lower resistance than would be formed by an accidental earth-connection with a conductor, at least when the accidental connection first commences; hence the leakage-meter will take substantially all the current that leaks to earth, although there may be an accidental ground on the same side of circuit.

What I claim is—

1. The combination, in a system of electrical distribution employing a complete metallic circuit, of a meter located in circuit between one side of the system and the earth at the point of generation, substantially as set forth.

2. The combination, in a system of electrical distribution employing a complete metallic circuit, of a meter or meters in the circuit of the system at the point of generation, and a meter located in circuit between one side of the system and the earth at the point of generation, substantially as set forth.

3. The combination, in a system of electrical distribution employing a complete metallic circuit, of a meter or meters in the circuit of the system at the point of generation, meters at the points of consumption, and a meter located in circuit between one side of the system and the earth at the point of generation, substantially as set forth.

This specification signed and witnessed this 31st day of May, 1881.

THOMAS A. EDISON.

Witnesses:
RICHD. N. DYER,
H. W. SEELY.